US006992564B2

(12) United States Patent
Connolly et al.

(10) Patent No.: US 6,992,564 B2
(45) Date of Patent: Jan. 31, 2006

(54) CORDLESS IDENTIFICATION SECURITY SYSTEM AND METHOD

(75) Inventors: Sean A. Connolly, Stony Brook, NY (US); William Sackett, Rocky Point, NY (US); Stephen J. Shellhammer, Lake Grove, NY (US); Frank Boccuzzi, Brooklyn, NY (US); Adam Levine, Huntington Station, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 443 days.

(21) Appl. No.: 09/909,369

(22) Filed: Jul. 19, 2001

(65) Prior Publication Data

US 2003/0016120 A1 Jan. 23, 2003

(51) Int. Cl.
*G06F 7/00* (2006.01)

(52) U.S. Cl. ..................... 340/5.62; 340/573.1; 379/38
(58) Field of Classification Search .......... 340/825.49, 340/5.61, 3.1, 825.36, 10.3, 10.31, 10.42, 340/5.62, 573.1; 379/38
See application file for complete search history.

(56) References Cited

U.S. PATENT DOCUMENTS

| | | | | |
|---|---|---|---|---|
| 5,218,344 A | * | 6/1993 | Ricketts | 340/573.4 |
| 5,664,113 A | * | 9/1997 | Worger et al. | 705/28 |
| 5,686,902 A | * | 11/1997 | Reis et al. | 340/10.2 |
| 5,768,379 A | | 6/1998 | Girault et al. | |
| 5,801,618 A | * | 9/1998 | Jenkins | 340/426.14 |
| 6,331,817 B1 | * | 12/2001 | Goldberg | 340/573.1 |

FOREIGN PATENT DOCUMENTS

| | | |
|---|---|---|
| EP | 0 621 565 | 10/1994 |
| EP | 0 716 399 | 6/1996 |
| WO | 01/39103 | 5/2001 |

* cited by examiner

*Primary Examiner*—Michael Horabik
*Assistant Examiner*—Matsuichiro Shimizu
(74) *Attorney, Agent, or Firm*—Fay Kaplun & Marcin, LLP

(57) ABSTRACT

A system and method described for tracking portable devices. The system may include a transmitter which transmits wireless inquiries to a plurality of portable devices and a receiver receiving replies to the inquiries from the portable devices. In addition, the system may include a memory storing identifier data corresponding to the portable devices and a processor coupled to the memory and to the receiver, the processor retrieving from each reply, identifier data uniquely identifying a particular one of the portable devices which generated the reply and comparing the identifier data to the stored identifier data. Furthermore, the system may include an alarm system coupled to the processor and controlled based on the comparison of stored identifier data to the identifier data retrieved from the replies.

24 Claims, 2 Drawing Sheets

CORDLESS IDENTIFICATION SECURITY SYSTEM AND METHOD

BACKGROUND INFORMATION

Conventional portable computing devices are becoming more powerful and expensive. The problem with such portable devices is that, due to their small size and/or light weight, they are often misplaced or stolen. For example, warehouse employees often utilize portable bar code scanners which, due to their small size, are difficult to manually track. Thus, replacement costs for these devices can become burdensome.

Some conventional security systems have attempted to deal with this issue. For example, small metal tags have been affixed to such portable devices so that, each time such a portable device is carried through a security area, the metal tag activates an alert system which notifies security personnel. However, such security systems cannot determine whether this portable device is being legitimately carried through the security area or whether it is being stolen. Thus, security personnel must conduct time-consuming investigations to make these determinations.

SUMMARY OF THE INVENTION

A system and method described for tracking portable devices. The system may include a transmitter which transmits wireless inquiries to a plurality of portable devices and a receiver receiving replies to the inquiries from the portable devices. In addition, the system may include a memory storing identifier data corresponding to the portable devices and a processor coupled to the memory and to the receiver, the processor retrieving from each reply, identifier data uniquely identifying a particular one of the portable devices which generated the reply and comparing the identifier data to the stored identifier data. Furthermore, the system may include an alarm system coupled to the processor and controlled based on the comparison of stored identifier data to the identifier data retrieved from the replies.

DETAILED DESCRIPTION

The present invention relates to a cordless/wireless identification security system and method. The exemplary embodiment of the present invention described below utilizes, as an example of cordless technology, Bluetooth technology. Bluetooth technology is designed to enable fast, robust and secure wireless communication between small, portable computing devices. Thus, this technology eliminates the need for proprietary cables which had previously been required to enable device connectivity. Those skilled in the art will understand that other cordless/wireless technologies may be utilized with the present invention.

Figure 1:
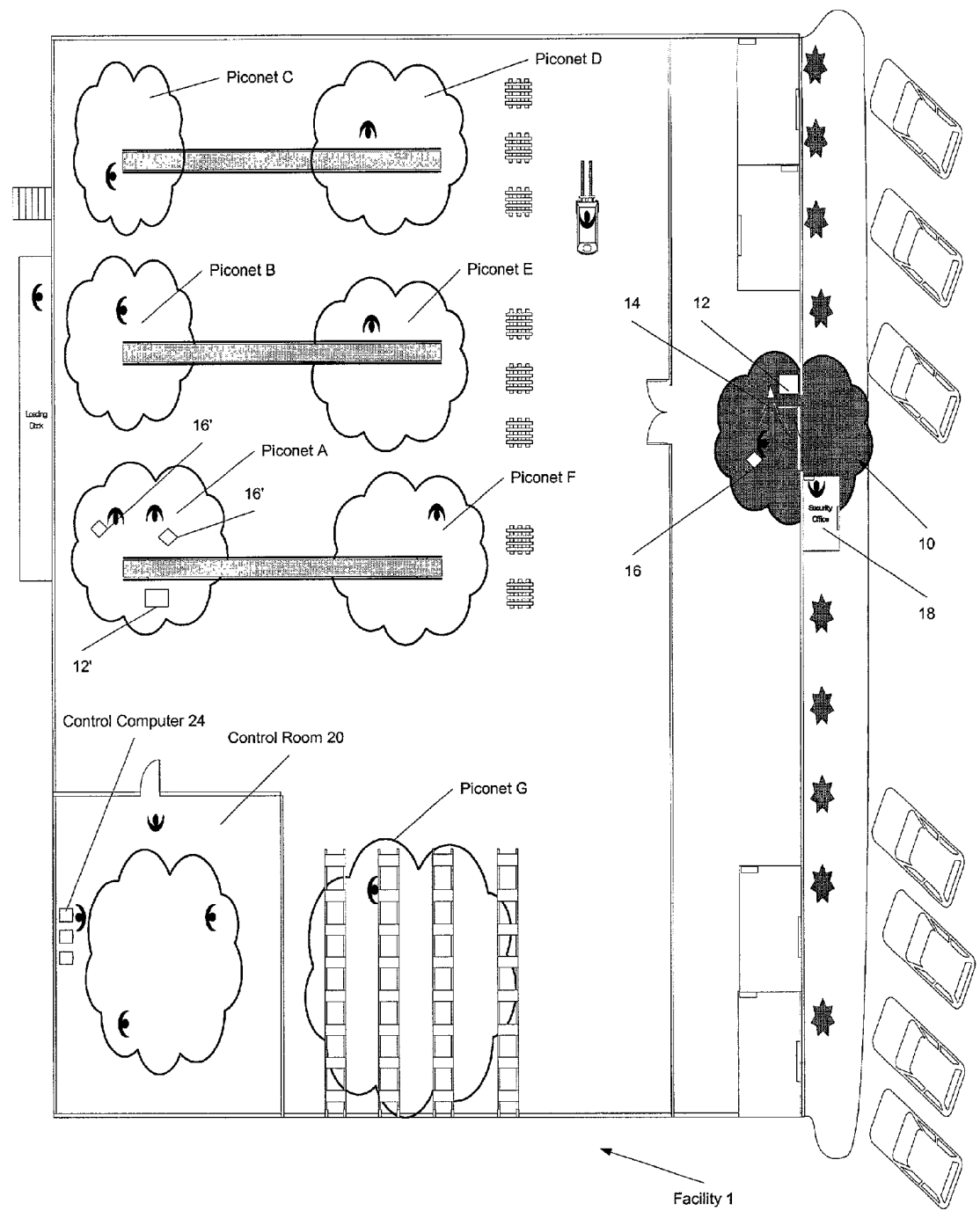
FIG. 1 shows an exemplary embodiment of a system according to the present invention.

FIG. 1 illustrates an exemplary embodiment of the system according to the present invention. In particular, FIG. 1 shows a facility 1 which utilizes portable devices 16. The portable devices 16 may be laptop computers, bar code scanners, computer terminals, beepers, phones, printers, personal digital assistants, etc. Each of various employees of the facility 1 receives a device 16 at a beginning of a working shift and returns the device 16 at the end of the shift. To assure that the devices 16 are not misplaced or stolen, the facility 1 utilizes a cordless identification security system and method for tracking the devices 16.

This system may include a security monitor device 12 and a control computer 24. The security monitor device 12 may be situated, for example, in a security area 10 of the facility 1. The security area 10 also may include a security office 18 where an alert system 14 and security personnel may be located.

The control computer 24 may be situated, for example, in a control room 20 of the facility 1. The control computer 24 may collect and maintain a record for each of the devices 16. In particular, the record may include technical information about a type of each device 16, a unique identification number ("UIN") for each device 16 which is assigned by the manufacturer, status and location information for each device 16 (e.g., whether the device 16 is activated and an indication as to where the device 16 may be situated), etc. The control computer 24 updates the record of each device 16 each time there is a change to the status of the device 16. Each time the facility 1 receives a new device 16, a corresponding record is generated and stored by the control computer 24.

Each of the portable devices 16 and the security monitor device 12 may include, for example, a Bluetooth radio transceiver, as is known in the art, which allows wireless communications to be established and facilitates data exchange. This radio transceiver may operate within, e.g., the 2.4 GHZ ISM band utilizing a 2.4 GHz Short Range Radio link protocol as defined by the Bluetooth Special Interest Group (SIG) in Bluetooth System Specification v. 1.1 (Dec. 1, 2000).

Bluetooth-enabled devices may be grouped into a plurality of piconets with each piconet including up to seven "slave" devices and one master device. The master device's clock and hopping sequences may be synchronized with those of the corresponding slave devices. In the exemplary embodiment of FIG. 1, a master device 12' (which is similar to the security monitor device 12) and two "slave" devices 16' (which are similar to the device 16) are shown in Piconet A. As described above, the master device 12' of Piconet A may have up to seven "slave" devices 16'. Additionally, each of Piconets B–G must have a master device 12' and may have up to seven "slave" devices 16'.

As would be understood by those skilled in the art, each of the Bluetooth-enabled devices may operate in a plurality of modes. By default, the device may be placed in a standby mode, during which the device performs scanning operations. The standby mode may allow the device to (a) listen for its own device access code for the duration of a scan window (e.g., 11.25 ms) (i.e., a request to enter a "page scan mode") or (b) listen for an inquiry access code (i.e., a request to enter a "inquiry scan mode"). The page scan mode is utilized to set up an actual connection between the two or more Bluetooth-enabled devices. The inquiry mode, on the other hand, is used to determine which devices are within the scan range of the another Bluetooth-enabled device.

Figure 2:
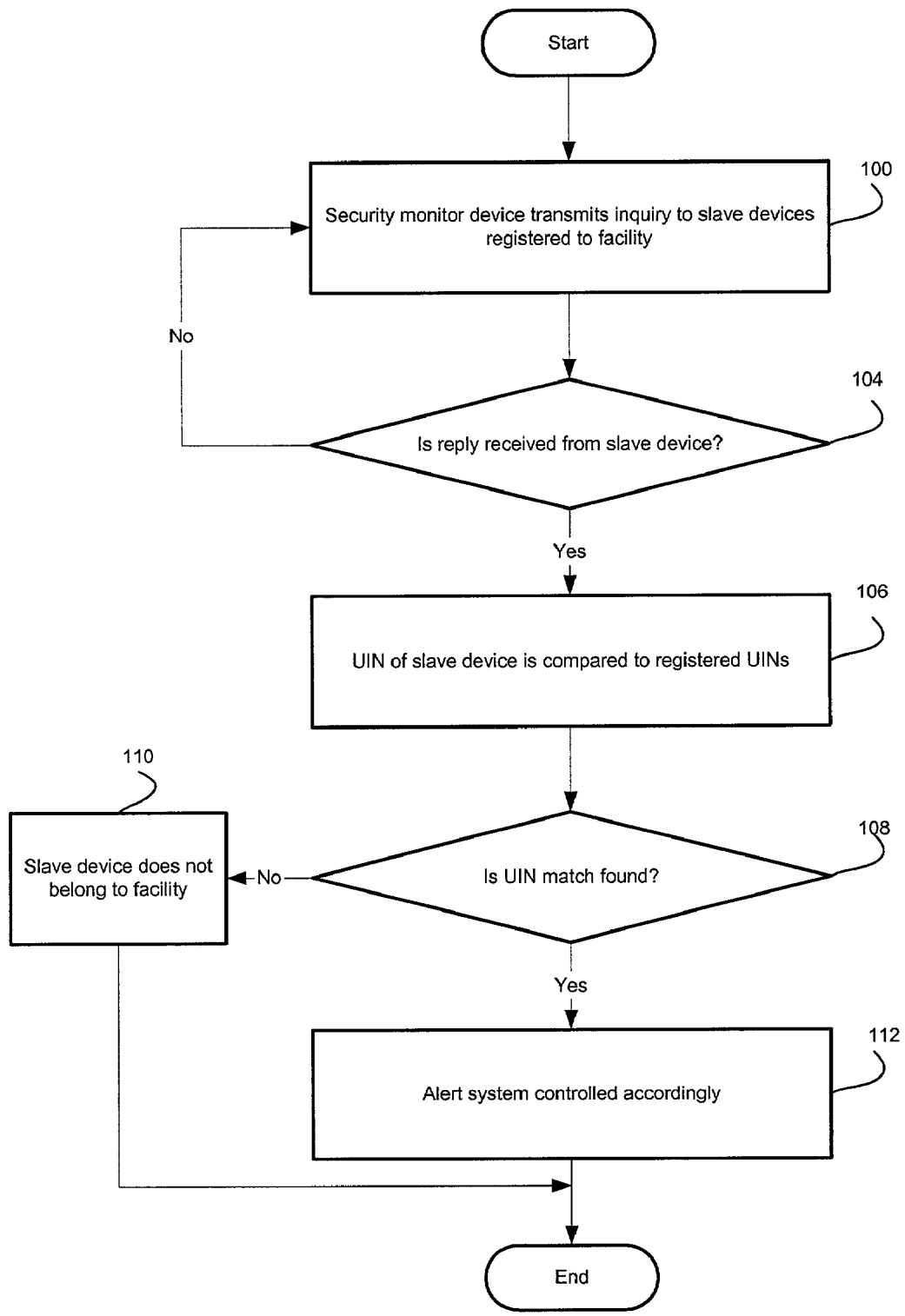
FIG. 2 shows an exemplary embodiment of a method according to the present invention.

FIG. 2 shows an exemplary embodiment of the method according to the present invention. The method is performed continuously as long as the identification security system is active. In step 100, security monitor device 12 is in the inquiry mode, transmitting inquiries to all devices 16 within the security area 10. The transmission of the inquires may be performed continuously. Each inquiry includes an inquiry access code and a request to all Bluetooth-enabled devices to respond and identify themselves. The devices 16 which are situated within the security area 10 "listen" for the inquiry access code and generate replies thereto which are forwarded to the security monitor device 12 (step 104). Each reply includes the UIN of the corresponding device 16. If no reply is received, the security monitor device 12 continues transmitting inquiries (step 100).

Once the security monitor device 12 has received a reply, the UIN of the device 16 is extracted and forwarded to the control computer 24 along with the date and time when the reply was received by the security monitor device 12 (step 106). The control computer 24 compares this UIN to a database of registered UINs to find a match (step 108). If no match is found, the control computer 24 indicates that the device 16 is not registered at the facility 1 (step 110). Thus, the control computer 24 does not need to activate the alert system 14 and the employee with the device 16 may exit the facility 1.

Alternatively, the system and method may be utilized to detect the existence of unregistered devices 16 in areas where they are not supposed to be. In this case, when the control computer 24 finds no match in step 110, the control computer 24 may activate the alert system 14 and inform the security personnel of the unregistered device 16 present in the security area 10.

If there is a match in step 108, the control computer 24 activates the alert system 14 (step 112). The activation of the alert system 14 may be made in many different ways. For instance, the alert system 14 may notify security personnel in the security office 18 who may then prevent the employee with the device 16 from exiting the security area 10. The alert system 14 may also activate security equipment (e.g., video cameras) situated, for example, in the security area 10 to record activities therein for as long as the device 16 is present within the security area 10 and continues to reply the inquires of the security monitor device 12. The alert system 14 may also automatically lock the security area 10 so that no one can leave the security area 10 until the device 16 is located. All of the above mentioned activities may be transmitted to the control computer 24 which may record the activities in a corresponding record for the particular device 16.

In another exemplary embodiment of the present invention, the system and method may be utilized to track misplaced devices 16. For instance, every time an employee carrying the device 16 passes through a particular security monitor device 12, this information is recorded by the control computer 24 so that later the movements of the device 16 may be tracked. The system and method according to the present invention may also be utilized to locate a device 16 or a employee carrying device 16 within the facility 1. The facility 1 may have a large number of the security monitor devices 12 which effectively cover the area of the facility 1. So that, when the device 16 is carried around the facility, its location is known.

In an alternative exemplary embodiment of the present invention, the system and method may be used to track employees time. For example, every employee may be assigned a Unique Employee Identification Number ("UEIN"). This UEIN may be stored in the control computer 24 along with the UIN of an assigned device 16 which the employee may carry as he enters/exits the facility 1 through the security area 10. For example, when an employee enters the facility 1 through the security area 10, the security monitor device 12 receives a reply to its inquiries from the device 16. The security monitor device 12 forwards this reply to the control computer 24 which determines the corresponding UEIN as a function of the UIN and records the date and time when the employee entered the facility 1. Based on that information, the facility 1 may track the employee's time.

The system and method may also be utilized in retail environments. For example, in a retail environment, Bluetooth-enabled devices may be integrated with Radio Frequency Identification tags ("RFID"). These integrated devices may serve as part of a dual-mode security system which allows detection of both the RFID tags and the Bluetooth-enabled devices. Thus, facilities may keep track of inventory of these devices 16 and prevent the devices 16 from leaving the facility 1. This reduces operating costs due to misplaced or stolen devices 16.

There are many modifications to the present invention which will be apparent to those skilled in the art without departing form the teaching of the present invention. The embodiments disclosed herein are for illustrative purposes only and are not intended to describe the bounds of the present invention which is to be limited only by the scope of the claims appended hereto.

What is claimed is:

1. A system for tracking portable devices comprising:
   a transmitter transmitting wireless inquiries to a plurality of portable devices;
   a receiver receiving replies to the inquiries from the portable devices;
   a memory arrangement storing identifier data corresponding to the portable devices, the identifier data including status information;
   a processor coupled to the memory arrangement and to the receiver, the processor retrieving from each reply, reply identifier data uniquely identifying a particular one of the portable devices which generated the reply and comparing the reply identifier data to the stored identifier data; and
   a portable device control system coupled to the processor and controlled based on the comparison of the stored identifier data to the identifier data retrieved from the replies, wherein, when the reply identifier data matches the stored identifier data the status information corresponding to the portable device is updated on the memory and, when the reply identifier data does not match the stored identifier data, the portable device control system provides an indication that the portable device is unregistered.

2. The system according to claim 1, wherein the transmitter and the receiver include a Bluetooth radio transceiver which utilizes a 2.4 GHZ Short Range Radio protocol.

3. The system according to claim 1, wherein the portable device includes a Bluetooth radio transceiver utilizing a 2.4 GHZ Short Range Radio protocol.

4. The system according to claim 1, wherein the portable devices include at least one of laptop computers, bar code scanners, computing terminals, beepers, phones, printers and personal digital assistants.

5. The system according to claim 1, wherein the inquiries include an include an inquiry access code which prompts the portable devices to generate the corresponding replies.

6. The system according to claim 1, wherein the processor retrieves from the reply, date and time when the reply was generated, the processor determining a corresponding employee identifying number as a function of the identifier data and storing the date and time into a data record corresponding to the employee identifying number.

7. The system according to claim 1, wherein the portable device control system includes a sound arrangement providing a sound alert when the reply identifier data retrieved from the replies matches to the stored identifier data.

8. The system according to claim 1, wherein the portable device control system includes a video arrangement taping an area from which the replies are received when the reply identifier data retrieved from the corresponding replies matches to the stored identifier data.

9. The system according to claim 1, wherein the portable device control system includes a display arrangement displaying to security personnel an area from which the replies are received when the reply identifier data retrieved from the corresponding replies matches to the stored identifier data.

10. The system according to claim 1, wherein the portable device control system includes a locking arrangement locking an area from which the replies are received when the identifier reply data retrieved from the corresponding replies matches to the stored identifier data.

11. The system according to claim 1, wherein the portable device control system is activated when the reply identifier data retrieved from the replies does not match to the stored identifier data.

12. The system according to claim 1, wherein the transmitter transmits the wireless inquiries continuously.

13. The system according to claim 1, further comprising:
a Radio Frequency Identification tag situated on each of the portable devices; and
a Radio Frequency Identification receiver coupled to the processor and being capable of detecting the presence of the tag in a predetermined area,
wherein the portable device control system is activated when at least one of (a) the Radio Frequency Identifier receiver detects the tag in the predetermined area and (b) the reply identifier data retrieved from the replies matches to the stored identifier data.

14. A method of tracking portable devices comprising the steps of:
transmitting from a security monitor device wireless inquiries to a plurality of portable devices;
retrieving from each reply to the inquiries received by the security monitor device, reply identifier data uniquely identifying a particular one of the portable devices which generated the reply and comparing the reply identifier data to stored identifier data, the stored identifier data including status information; and
controlling operation of a portable device control system based on the comparison of the stored identifier data to the identifier data retrieved from the replies, wherein, when the reply identifier data matches the stored identifier data the status information corresponding to the portable device is updated and, when the reply identifier data does not match the stored identifier data, the portable device control system provides an indication that the portable device is unregistered.

15. The method according to claim 14, wherein, in the transmitted step, the security monitor device transmits the wireless inquiries continuously.

16. The method according to claim 14, further comprising the step of:
with a Bluetooth radio transceiver of the security monitor device, transmitting the inquiries utilizing a 2.4 GHZ Short Range Radio protocol.

17. The method according to claim 14, further comprising the step of:
before the transmitting step, generating the inquiries to include an inquiry access code, the inquiry access code being capable of prompting the portable devices to generate the corresponding replies.

18. The method according to claim 17, further comprising the steps of:
before retrieving step, receiving the inquiries by the particular device; and
generating the reply as a function of the inquiry access code.

19. The method according to claim 14, further comprising the steps of:
retrieving from the reply, date and time when the reply was generated;
determining a corresponding employee identifying number as a function of the identifier data; and
storing the data and time corresponding to the employee identifying number.

20. The method according to claim 14, further comprising the step of:
using the portable device control system, providing a sound alert when the reply identifier data retrieved from the replies matches to the stored identifier data.

21. The method according to claim 14, further comprising the step of:
using the portable device control system, taping an area form which the replies are received when the reply identifier data retrieved from the corresponding replies matches to the stored identifier data.

22. The method according to claim 14, further comprising the step of:
using the portable device control system, locking an area from which the replies are received when the reply identifier data retrieved from the corresponding replies matches to the stored identifier data.

23. The method according to claim 14, further comprising the step of:
activating the portable device control system when the reply identifier data retrieved from the replies does not match to the stored identifier data.

24. The method according to claim 14, further comprising the step of:
controlling the portable device control system when at least one of (a) a Radio Frequency Identifier receiver detects a Radio Frequency Tag situated on one of the portable devices in a predetermined area and (b) the reply identifier data retrieved from the replies matches to the stored identifier data.

* * * * *